US 6,700,064 B2

(12) United States Patent
Aoki et al.

(10) Patent No.: US 6,700,064 B2
(45) Date of Patent: Mar. 2, 2004

(54) WIRING HARNESS ARRANGEMENT ASSEMBLY FOR SLIDING DOOR OF CAR (75) Inventors: Tohru Aoki, Shizuoka (JP); Kenichi Doshita, Shizuoka (JP); Mitsunori Tsunoda, Shizuoka (JP); Ryoichi Fukumoto, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/097,094

(22) Filed: Mar. 14, 2002

(65) Prior Publication Data
US 2002/0151213 A1 Oct. 17, 2002

(30) Foreign Application Priority Data
Mar. 16, 2001 (JP) ........................................ 2001-076511

(51) Int. Cl.[7] ................ B60J 5/06; F16L 3/00
(52) U.S. Cl. .................... 174/69; 248/73; 248/74.1; 296/155
(58) Field of Search .............. 174/135, 72 A, 174/69; 439/34, 162; 296/155; 248/71, 73, 75, 70, 74.2, 74.3, 74.4, 74.1

(56) References Cited
U.S. PATENT DOCUMENTS 4,784,358 A * 11/1988 Kohut .................... 248/73
4,902,150 A * 2/1990 Imai ........................ 174/69
5,507,460 A * 4/1996 Schneider ................ 248/73
5,653,410 A * 8/1997 Stroeters et al. ......... 248/73
5,879,047 A  3/1999 Yamaguchi et al. ...... 296/146.7
5,962,814 A  10/1999 Skipworth et al. ....... 174/135
6,494,523 B2 * 12/2002 Kobayashi ............... 296/155
6,595,473 B2 * 7/2003 Aoki et al. ............... 248/74.4

FOREIGN PATENT DOCUMENTS

JP         2000-2364      1/2000
JP         2000-264136    9/2000

* cited by examiner

Primary Examiner—Neil Abrams
(74) Attorney, Agent, or Firm—Armstrong, Kratz, Quintos, Hanson & Brooks, LLP (57) ABSTRACT A pivotal harness guide 3 is provided in a side of a car body 1 or a sliding door, and a corrugated tube 4 is secured to the harness guide. The corrugated tube 4 may be held turnably in a circumferential direction of the corrugated tube 4 by the harness guide. The harness guide 3 has a locking projection that engages with a groove formed in the corrugated tube 4. The harness guide 3 has a harness support member 5 for securing the corrugated tube 4 to the harness guide and a base member 9 for turnably connecting the harness support member to the base member by a connecting member, and the base member is secured to the car body or the sliding door. The corrugated tube 4 may be turnable together with harness supporting cradles within a cylindrical wall formed in a panel of the car body.

7 Claims, 7 Drawing Sheets

WIRING HARNESS ARRANGEMENT ASSEMBLY FOR SLIDING DOOR OF CAR

BACKGROUND OF THE INVENTION

1. Field of the Invention

The present invention relates to a wiring harness arrangement assembly for transmission of a power and signals between a car body side and electrical equipment including auxiliary instruments disposed in a sliding door side. Particularly, the wiring harness is covered by a corrugated tube, and the wiring harness arrangement assembly has a pivotal harness guide to allow a sufficient flexibility and an appropriate torsional performance of the wiring harness received in the corrugated tube.

2. Related Art

A one-box car or a wagon has a sliding door for which various types of electric supply units have been proposed to supply a power from a power source disposed in a car body side to the sliding door and to transmit electrical signals from the sliding door to the car body side.

The sliding door is equipped with several types of functional instruments such as electrical equipment and auxiliary instruments like a motor for opening and closing a window, a door lock unit, a speaker, a switch unit, and an electronic control unit. For the functional instruments, it is necessary to supply an electrical power and to transmit electrical signals not only when the sliding door is closed but also the sliding door is open.

Figure 11A:
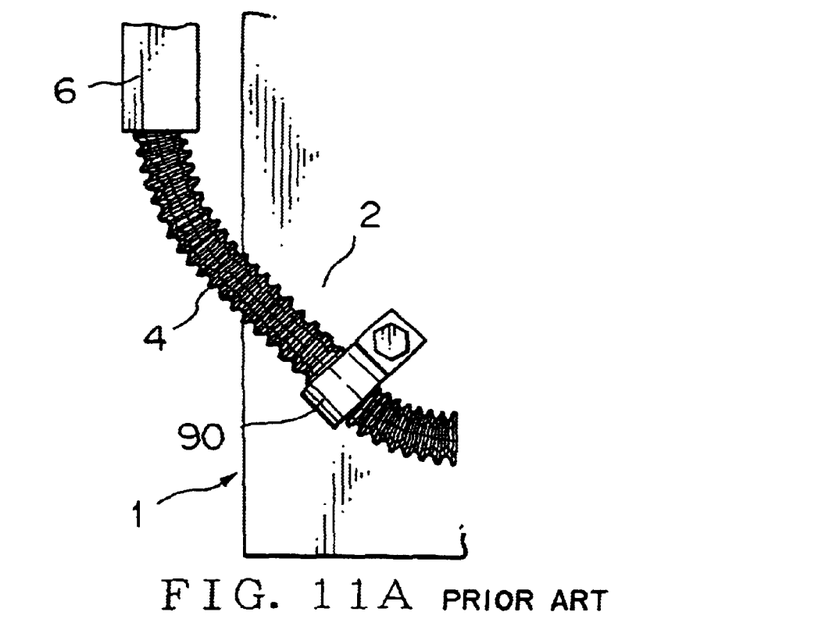
FIGS. 11A and 11B are general plan views showing a conventional wiring harness arrangement assembly sequentially in closed and open states of a sliding door.
Figure 11B:
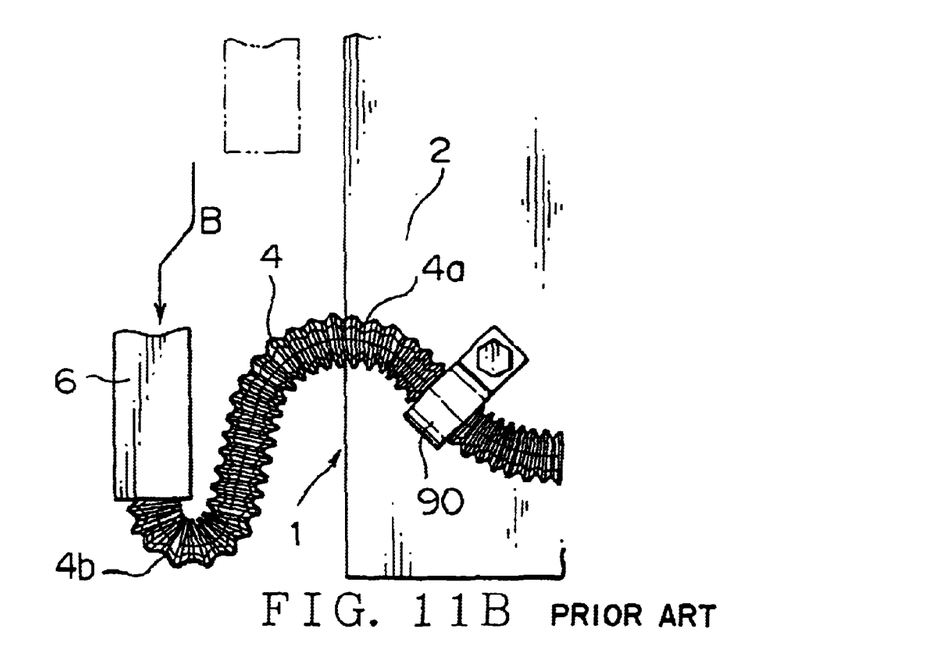

FIGS. 11A and 11B show an example of a conventional wiring harness arrangement assembly for a sliding door.

The wiring harness, which is received in an annular corrugated tube 4, is arranged from a car body 1 to a sliding door 6. The corrugated tube 4 is made of a synthetic resin material and has an inner diameter larger than a wiring harness (not shown). The corrugated tube 4 is a bellows constituted by a thin shell having a rectangular cross-section so that the corrugated tube 4 is flexible together with the wiring harness.

FIG. 11A shows a closed state of the sliding door 6. As illustrated in the drawing, a longitudinal middle portion of the corrugated tube 4 is secured on a step 2 of the car body 1 with a clamp 90. The corrugated tube 4 is curved from the clamp 90 to extend toward a rearward end of the sliding door 6. Each electrical cable of the wiring harness is connected to one of the functional instruments (not shown) in the sliding door. The wiring harness consists of a plurality of the electrical cables.

As illustrated in FIG. 11B, with the rearward sliding of the sliding door 6 along an arrow B to open the door, the wiring harness is bent rearward together with-the corrugated tube 4 to absorb the sliding stroke of the sliding door 6.

However, in the conventional configuration, the opening and closing movement of the sliding door 6 causes the corrugated tube having the wiring harness to be forcedly bent with a smaller bending radius at an adjacent position 4a of the clamp 90 or at an adjacent position 4b of the rear end of the sliding door 6. Thus, repeated opening and closing operations of the sliding door 6 tend to disadvantageously cause a damage of the wiring harness and the corrugated tube 4 at the bent portions 4a and 4b. The forcible local bent with a smaller bending radius of the wiring harness and the corrugated tube 4 exerts an undesirable force on the wiring harness and the corrugated tube 4. This causes a strong reaction force of the wiring harness and the corrugated tube 4, providing an interference between the corrugated tube 4 and the sliding door 6 or the car body 1. Furthermore, the corrugated tube 4 may be possibly pinched between the sliding door 6 and the car body 1. Thereby, a damage of the wiring harness and the corrugated tube 4 may happen and an undesired noise may be generated. Moreover, a torsional force may be exerted on the wiring harness and the corrugated tube 4 due to the forcible bent of the corrugated tube 4, causing a damage of the wiring harness and the corrugated tube 4. That is, a smooth bending of the corrugated tube 4 has been disadvantageously prevented.

Furthermore, since the clamp 90 is disposed at a different position according to a type of a car or a sliding door, the adjacent positions 4a and 4b of the wiring harness and the corrugated tube 4 receive abnormal forces, and a smooth bending of the wiring harness and the corrugated tube 4 is disadvantageously prevented.

The use of a flexible flat cable (FFC) in place of a wiring harness improves a bending performance thereof. However, the flat cable is constituted by printed circuit conductors each having a small sectional area and an insulating sheet, so that the flat cable disadvantageously has a small transmission capacity for supplying a small amount of an electrical power and electrical signals.

The use of a junction switch unit for switching each of electrical cables to connect to each functional instrument results in an increase of a manufacturing cost.

SUMMARY OF THE INVENTION

In view of the aforementioned disadvantages of the conventional art, an object of the present invention is to provide a wiring harness arrangement assembly for a sliding door which allows a smooth bending of a wiring harness with a corrugated tube. The wiring harness and the corrugated tube will not receive too much stresses and will not suffer a damages thereof due to repeated opening and closing operations of the sliding door. The wiring harness with the corrugated tube decreases an assembling cost thereof and is commonly used for various types of cars and sliding doors.

For achieving the object, a first aspect of the invention is a wiring harness arrangement assembly for arranging a wiring harness received in a corrugated tube from a body to a sliding door of a car, wherein a pivotal harness guide is provided in a side of the body or the sliding door, and the corrugated tube is secured to the harness guide.

A second aspect of the invention is the wiring harness arrangement assembly as described in the first aspect, wherein the harness guide has a harness support member for securing the corrugated tube to the harness guide and a base member for turnably connecting the harness support member to the base member.

A third aspect of the wiring harness arrangement assembly as described in the first aspect, wherein a stopper for limiting a pivoting angle of the harness support member is provided on the harness guide, the body, or the sliding door.

A fourth aspect of the invention is a wiring harness arrangement assembly for arranging a wiring harness received in a corrugated tube from a body to a sliding door of a car, wherein a harness guide is provided in a side of the body or the sliding door, and the corrugated tube is held turnably in a circumferential direction of the harness guide by the harness guide.

A fifth aspect of the invention is the wiring harness arrangement assembly as described in the first aspect, wherein the harness guide has a locking projection that engages with a groove formed in the corrugated tube.

A sixth aspect of the invention is the wiring harness arrangement assembly as described in the fifth aspect, wherein the harness guide has a base plate for positioning the corrugated tube along the base plate, a side plate raised from each side of the base plate, and an additional side plate raised from each the side plates, the additional side plate formed with the locking projection projected inside of the harness guide.

A seventh aspect of the invention is the wiring harness arrangement assembly as described in the fifth aspect, wherein the harness guide has a cradle and a cap which are formed with a pair of the locking projections opposed to each other so that the cradle and the cap hold the corrugated tube.

An eighth aspect of the invention is the wiring harness arrangement assembly as described in the seventh aspect, wherein the cap has a hinge around which the cap can be turned to open the harness guide.

A ninth aspect of the invention is the wiring harness arrangement assembly as described in the seventh aspect, wherein the cradle has a lock means for locking the cap to the cradle.

A tenth aspect of the invention is the wiring harness arrangement assembly as described in the fifth aspect, wherein the corrugated tube is turnable in its circumferential direction along the locking projection.

An eleventh aspect of the invention is the wiring harness arrangement assembly as described in the seventh aspect further comprising a locking member and an annular member disposed between the cradle and the cap, wherein the locking member enters the annular member and engages with the groove of the corrugated tube.

A twelfth aspect of the invention is the wiring harness arrangement assembly as described in the eleventh aspect wherein the annular member is turnable in a circumferential direction of the annular member between the cradle and the cap.

A thirteenth aspect of the invention is the wiring harness arrangement assembly as described in the seventh aspect wherein the cradle has a harness support member extended from the cradle.

A fourteenth aspect of the invention is the wiring harness arrangement assembly as described in the thirteenth aspect wherein the wiring harness is connected to another wiring harness disposed in a side of the body by a connector, and the harness support member is extended toward the connector.

A fifteenth aspect of the invention is the wiring harness arrangement assembly as described in the first aspect wherein the harness guide is positioned on a step, a scuffing plate, or a floor of the car body.

A sixteenth aspect of the invention is a wiring harness arrangement assembly for arranging a wiring harness received in a corrugated tube from a body to a sliding door of a car, the wiring harness arrangement assembly comprising a cylindrical wall and a pair of harness supporting cradles separated from each other, the cylindrical wall formed on a panel of the body or of the sliding door, the harness supporting cradles holding the corrugated tube, wherein the harness supporting cradles are turnably received in the cylindrical wall.

A seventeen aspect of the invention is the wiring harness arrangement assembly as described in the sixteenth aspect wherein the harness supporting cradle has a locking piece and a stopper for the cylindrical wall.

An eighteenth aspect of the invention is the wiring harness arrangement assembly as described in the sixteenth aspect wherein the harness supporting cradle has a locking projection to hold the corrugated tube.

Next, advantageous effects of the present invention will discussed.

In the first aspect of the invention, the corrugated tube is secured to the pivotal harness guide, so that the wiring harness received in the corrugated tube 4 is turned together with the harness support 5. Thereby, the wiring harness and the corrugated tube 4 will not receive an abnormal torsional or bending force, eliminating a damage or an undesirable permanent deformation of the wiring harness and the corrugated tube 4 due to the repeated opening and closing of the sliding door. Furthermore, the corrugated tube 4 will not make a springback motion and will not interfere with the sliding door 6 and the car body 1, so that neither an undesirable noise nor a damage of the corrugated tube 4 due to the interference may happen.

The corrugated tube 4, which accommodates the wiring harness consisting of a plurality of electrical cables, eliminates a hand work to make a bundle of the cables with winding tapes. This improves the flexibility of the wiring harness. In this invention, the pivotal harness guide holds not the wiring harness but the corrugated tube, so that the wiring harness freely slides in the corrugated tube. Thus, the bending flexibility of the wiring harness remarkably improves as compared with when the wiring harness is directly held by the pivotal harness guide.

In the second aspect of the invention, the base member is secured to the body or the sliding door, and the harness support member is supported turnably around the connecting member. This provides a simplified harness guide which is economical in cost. The harness guide causes less troubles and is easily fitted to any position of the sliding door and the car body. Thus, regardless of types of cars and slide doors, an improved bending flexibility of the wiring harness and the corrugated tube can be achieved at the opening and closing of the sliding door. This can be also achieved when the harness support member is directly supported by the sliding door or the car body via the connecting member without the base member.

In the third aspect of the invention, the harness guide abuts against the stopper at the full open and closed states of the sliding door, so that the turning angle of the harness guide is limited. A too much movement of the harness guide is prevented and the harness guide can surely return to its original position, allowing a smooth turning of the harness guide in its normal and reverse directions with the opening and closing of the sliding door.

In the fourth aspect of the invention, the corrugated tube turns within the harness guide in the circumferential direction thereof even when the wiring harness receives a torsional force with the opening and closing movement of the slid. Thus, the corrugated tube and the wiring harness receive no abnormal torsional force, preventing a permanent deformation, a damage, a wear, and a noise generated by a friction in respect of the corrugated tube and the wiring harness. Accordingly, a smooth movement of the wiring harness can be achieved.

In the fifth aspect of the invention, the corrugated tube accommodating the wiring harness is assembled with the harness guide, and at the same time, the -locking projection engages with the groove formed in the corrugated tube. Thus, the corrugated tube is easily secured, improving a workability in arrangement of the wiring harness. Since the locking projection engages with the groove formed in the corrugated tube, the corrugated tube is surely retained longitudinally without a looseness, so that the corrugated tube accommodating the wiring harness is reliably held against a vibration generated during a running state of the car or at the opening and closing of the sliding door.

In the sixth aspect of the invention, the corrugated tube accommodating the wiring harness is supported by the base plate without a looseness (sage), and the corrugated tube is surrounded to be reliably held by the base plate, the side plates, and the additional side plates. Furthermore, the locking projection engages with the groove, so that the corrugated tube is longitudinally secured without looseness to be reliably supported. Moreover, the corrugated tube is assembled with the base plate from above, and at the same time, the locking projection engages with the groove formed in the corrugated tube. Thus, the corrugated tube is secured with ease, improving a workability in arrangement of the wiring harness.

In the seventh aspect of the invention, the corrugated tube accommodating the wiring harness is put on the cradle, and at the same time, the locking projection of the cradle engages with the groove formed in the corrugated tube. Then, the cap is assembled from above with the cradle, so that the locking projection of the cap engages with the groove of the corrugated tube to surely hold the corrugated tube without a looseness. Thus, the corrugated tube is more reliably supported, preventing disengagement of the corrugated tube from the harness guide. Moreover, no winding works with vinyl tapes are required for securing the corrugated tube to the harness guide. This allows an easy maintenance and a reduced assembling man hour thereof.

In the eighth aspect of the invention, the cap is joined to the cradle via the hinge, so that there is no possibility of missing of the cap. Thus, the cap is easily assembled with cradle to hold the corrugated tube accommodating the wiring harness with a decreased man hour.

In the ninth aspect of the invention, the cap is locked to the cradle with the locking means, so that the corrugated tube accommodating the wiring harness is surely held between the cap and cradle. This prevents disengagement of the cap to surely hold the corrugated tube.

In the tenth aspect of the invention, the corrugated tube turns within the harness guide in the circumferential direction thereof even when the wiring harness receives a torsional force with the opening and closing movement of the sliding door. Thus, the corrugated tube and the wiring harness receive no abnormal torsional force, preventing a permanent deformation thereof. Accordingly, a smooth movement of the wiring harness can be achieved.

In the eleventh aspect of the invention, the flat corrugated tube accommodating a plurality of electrical cables arranged in a flat shape is inserted into the annular member. Then, the locking member is engaged with the annular member to lock the flat corrugated tube, and the annular member is inserted between the cradle and the cap. Thereby, the flat corrugated tube is surely held therein. Since the flat corrugated tube pivots together with the harness guide, so that the flat corrugated tube can be smoothly bent with no abnormal torsional and bending forces.

In the twelfth aspect of the invention, the flat corrugated tube turns together with the annular member within the harness guide in the circumferential direction thereof even when the wiring harness receives a torsional force with the opening and closing movement of the sliding door. Thus, the flat corrugated tube receives no abnormal torsional force, allowing a smooth bending movement of the wiring harness.

In the thirteenth aspect of the invention, the elongated harness guide portion supports the corrugated tube accommodating the wiring harness, so that an undesired sag of the corrugated tube is eliminated. Thus, the corrugated tube moves reliably along a horizontal plain with the opening and closing movement of the sliding door. Accordingly, the corrugated tube is prevented from pinching and jamming thereof between the sliding door and the car body, and the harness guide can pivot smoothly, allowing a smooth bending movement of the corrugated tube accommodating the wiring harness. In addition, the corrugated tube is surely secured to both the cradle and the harness support member without a looseness.

In the fourteenth aspect of the invention, the harness support member is extended toward the connector for another wiring harness disposed in the car body side. The elongated harness support member pivots around the cradle with the opening and closing movement of the sliding door, so that the wiring harness disposed in the sliding door side pivots with no abnormal torsion and bending forces. Thus the wiring harness disposed in the car body side receives no larger torsional and bending forces to be surely protected.

In the fifteenth aspect of the invention, the the harness guide is positioned on a step, a scuffing plate, or a floor of the car body according to types of cars and sliding doors. Thus, various types of the wiring harness arrangement assemblies can be easily provided with a low cost.

In the sixteenth aspect of the invention, the corrugated tube turns together with the harness support member within the cylindrical wall in the circumferential direction thereof even when the wiring harness receives a torsional force with the opening and closing movement of the slid. When the corrugated tube has a circular section, the corrugated tube also turns within the harness support member in the circumferential direction thereof. When the corrugated tube has an elongated circle section, the corrugated tube is secured to the harness support member. Thus, the corrugated tube and the wiring harness receive no abnormal torsional force, preventing a permanent deformation, a damage, a wear, and a noise generated by a friction in respect of the corrugated tube and the wiring harness. Accordingly, a smooth movement of the wiring harness can be achieved.

Furthermore, the cylindrical wall can be unitarily formed with a panel of the car body to simplify the construction thereof, allowing a reduced cost of parts. The harness support member, which has received the wiring harness or the corrugated tube, can be inserted into the cylindrical wall, providing a simplified fitting work of the harness guide.

In the seventeenth aspect of the invention, the harness support member is inserted into the cylindrical wall, and at the same time, the locking piece engages with an end of the cylindrical wall of the panel while the stopper abuts against the other end of the cylindrical wall. Thereby, the harness support member is secured in its longitudinal direction so that the wiring harness and the corrugated tube are surely supported by the panel.

In the eighteenth aspect of the invention, the locking projection of the harness support member engages with the groove of the corrugated tube so that the corrugated tube is correctly positioned in its longitudinal direction to provide a predetermined extended length of the wiring harness from the panel.

DETAILED DESCRIPTION OF THE PREFERRED EMBODIMENTS

Figure 1:
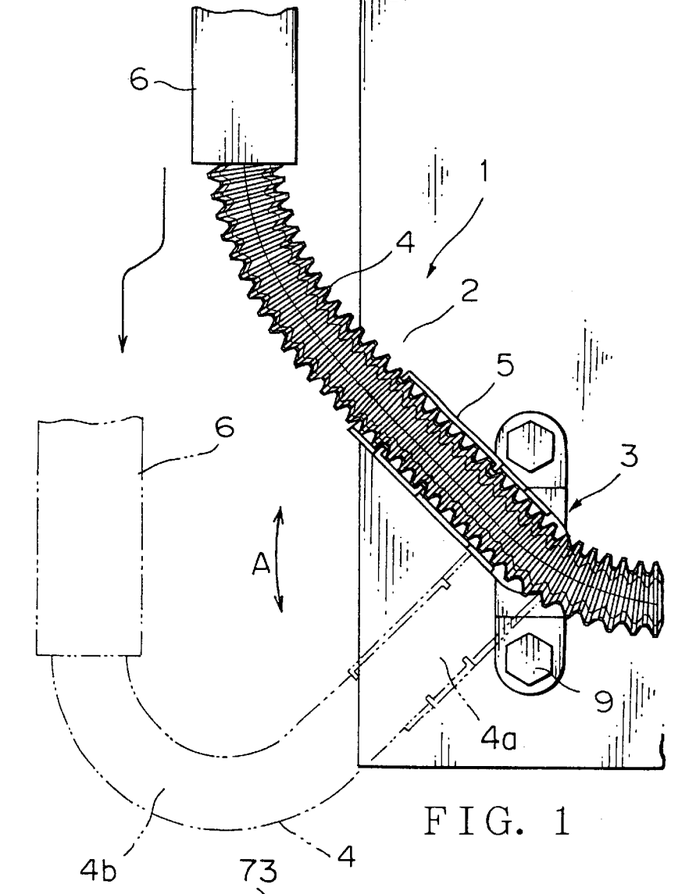
FIG. 1 is a plan view generally showing an embodiment of a wiring harness arrangement assembly for a sliding door according to the present invention.

Referring to the accompanied drawings, embodiments of the present invention will be discussed hereinafter. FIG. 1 shows an embodiment of a wiring harness arrangement assembly for a sliding door according to the present invention.

The wiring harness arrangement assembly has a pivotal harness guide 3 located on or near a step 2 of a car body 1 and a corrugated tube 4 accomodating a wiring harness (not shown). The corrugated tube 4 is secured on a pivotal harness support 5 of the harness guide 3, so that the wiring harness is pivotal together with the corrugated tube 4 in the opening and closing directions (longitudinal directions) of the sliding door as shown by an arrow A.

The wiring harness is arranged from a side of the car body 1 to the sliding door 6 via the harness guide 3 and a rear end of the sliding door 6. At a full open state of the sliding door 6, the harness support 5 of the harness guide 3 is turned to be moved diagonally forward, while at a completely closed state of the sliding door 6, the harness support 5 is turned to be moved diagonally rearward. The wiring harness received in the corrugated tube 4 is smoothly turned together with the harness support 5 to be bent with ease.

Thus, at the full open state of the sliding door 6, the wiring harness and the corrugated tube 4 will not be bent with a small curvature radius but will be smoothly bent with a large curvature radius. Particularly, the wiring harness and the corrugated tube 4 will be smoothly bent with a large curvature radius at an adjacent position 4a of the pivotal harness guide 3 and at an adjacent position 4b of a rear end of the sliding door 6.

Thereby, the wiring harness and the corrugated tube 4 will not receive an abnormal torsional or bending force, eliminating a damage or an undesirable permanent deformation of the wiring harness and the corrugated tube 4. Furthermore, the corrugated tube 4 will not make a springback motion and will not interfere with the sliding door 6 and the car body 1, so that neither an undesirable noise nor damage of the corrugated tube 4 due to the interference may happen.

The corrugated tube 4 itself is a conventional one having a rectangular cross-section. The corrugated tube 4 has a plurality of lateral peripheral peaks and valleys parallel to one another so that the corrugated tube 4 is flexible. The corrugated tube 4 protects a wiring harness consisting of a plurality of electrical cables (not shown) and eliminates a hand work to make a bundle of the cables with winding tapes which decrease the flexibility of the wiring harness.

Figure 2:
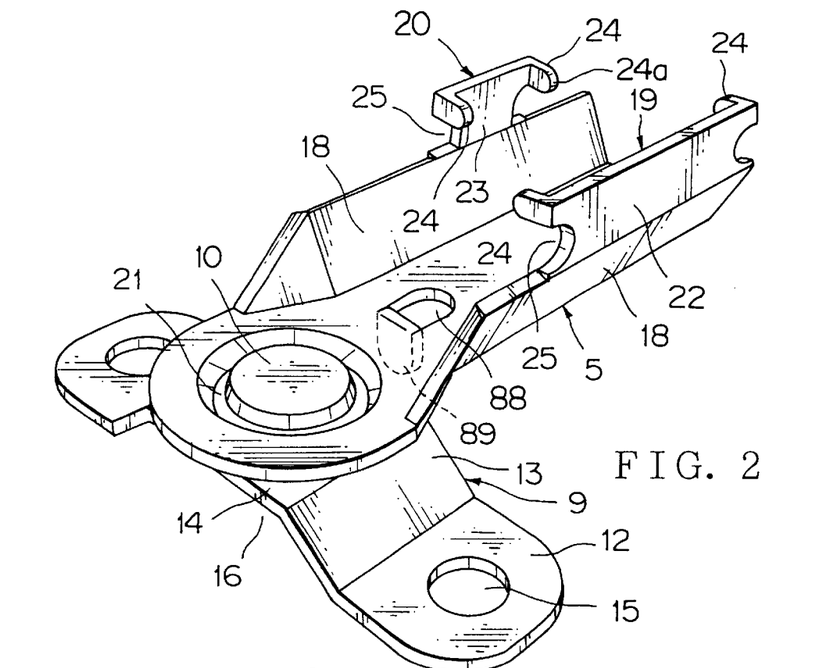
FIG. 2 is a perspective view showing a first embodiment of a pivotal harness guide of the wiring harness arrangement assembly.

FIG. 2 shows an example of the pivotal harness guide. The harness guide 3 has a base member 9 secured to a car body side and a harness support 5. The harness support 5 is turnably horizontally supported by the base member 9 via a rivet 10 (connection member). The base member 9 and/or the harness support 5 are made of a synthetic resin material.

The base member 9 is bent to have a trapezoid from at a middle thereof. The base member 9 has a pair of fixing portions 12 each positioned at a left or right side thereof and a bearing portion 14 at a middle thereof. The bearing portion 14 is raised from the fixing portions 12 via inclined portions 13. The bearing portion 14 is formed with a hole (not shown) for receiving a securing rivet 10 at a middle portion thereof. The rivet 10 may be replaced by a bolt (connection member), a collar, a securing nut. A space under the securing portion 12 receives a securing portion of the rivet 10 or the nut.

The harness support 5 has a horizontally extended base plate 17, a pair of side plates 18 each raised from each side of the base plate 17 slightly diagonally outward and has corrugated tube locking portions 19, 20 each contiguous with an upper end of each side plate 18.

The base plate 17 is generally flat and has a downwardly embossed portion contacting a head part of the rivet 10. The base plate 17 has a circular recess 21 at an upper part thereof for receiving the head part. At a rear side of the recess 21, there is provided a circular slidingly contacting surface for the bearing portion 14 of the base member 9. In a side of the rivet 10, the base plate 17 has a depending projection 89 which is a turning stopper for the ago base member 9. The projection 89 is easily formed by downwardly opening a cutout 88 at the press forming of the base plate 17. The projection 89 abuts against an edge of the bearing portion 14 or the inclined portion 13 to limit the pivoting angle of the harness support 5. The projection 89 may be modified to be at a different position in a longitudinal direction of the base plate 17 to adjust the turning angle of the harness support 5. When the projection 89 is positioned at a middle of the base plate 17 in a lateral direction of the base plate 17, the harness support 5 has left and right turning angles the same as each other. When the projection 89 is offset from the middle of the base plate 17 in a lateral direction of the base plate 17, the harness support 5 has left and right turning angles different from each other. The projection 89 may be modified to orient in a direction different from the direction shown in FIG. 2 to change the turning range. Alternatively, a pair of left and right abutment projections may be provided on the base member 9 to contact the a side edge of the harness support 5.

The harness support 5 has one corrugated tube locking portion 19 having a longer horizontal length and another corrugated tube locking portion 20 having a shorter horizontal length. Each corrugated tube locking portion 19 or 20 has an additional side plate 22 or 23 raised generally vertically from the side plate 18 thereof. The side plates 22 and 23 or the locking projections 24 may be slightly inclined inward. Each additional side plate 22 or 23 has a pair of the locking projections 24 respectively positioned at each longitudinal upper end thereof.

Each of the four locking projections 24 is a piece having a thickness smaller than the groove of the corrugated tube 4 (FIG. 1) and is positioned generally parallel to each other in a longitudinal direction thereof. The locking projection 24 has a leading end smoothly curved in an arc shape 24*a* to make no damage on the corrugated tube 4. Each additional side plate 22, or 23 has a little resiliency to deflect in a lateral direction thereof. The side plate 23 or 23 has a circular or rectangular cutout 25 provided under the each locking projection 24.

The corrugated tube 4 (FIG. 1) accomodating the wiring harness is arranged along the base plate 17, and the two parts of locking projections 24 engage with grooves positioned in an upper side of the corrugated tube 4 so that the corrugated tube 4 is held by the harness support 5 not to be drawn out upward and in a longitudinal direction thereof. It is understood that the downward movement of the corrugated tube 4 is also stopped by the base plate 17. The corrugated tube 4 is easily inserted relative to the base plate 17 from above. At the same time, the locking projections 24 engage with the grooves of the corrugated tube 4. Thus, the arrangement work of the corrugated tube 4 is easily completed. At the insertion of the corrugated tube 4, the additional side plates 22, 23 deflect outward to allow the movement of the corrugated tube 4 into the side plates 18.

The corrugated tube 4 (FIG. 1) having a circular cross-section is guided to be held in a longitudinal direction thereof by the side plates 18 and the slightly inwardly inclined additional side plates 22 and 23 with no looseness therebetween. Furthermore, a hook portion of each locking projection 24 surely secures the corrugated tube 4 in the harness support 5.

It may be possible that the locking projection 24 provides a smaller pressing force exerted on the corrugated tube 4 so that the corrugated tube 4 can turn in its circumferential direction along the locking projection 24. This configuration allows a torsional movement of the corrugated tube 4 due to the opening and closing of the sliding door 6, decreasing a torsion stress of the corrugated tube 4.

The head of the rivet 10 is received in a recess 21 in the turning base side of the base plate 17 such that the head does not interfere with the corrugated tube 4 (FIG, 1). Thus, the corrugated tube 4 is positioned straight within the harness support 5. The recess 21 has an annular rear surface embossed rearward, which provides a smaller sliding surface for the bearing portion 14 of the base member 9, achieving a better turnability of the harness support 5.

The corrugated tube 4 may be secured to the harness support 5 by winding a securing means (not shown) such as a tape or a band around the corrugated tube 4 and the harness support 5. In that case, a notch 25 provided at each side of the additional side plates 22, 23 is used to stop the tape.

The four locking projections 24 each engage a different groove of the corrugated tube 4 (FIG. 1), surely preventing a longitudinal movement of the corrugated tube 4 within the harness support 5.

More than two of the locking projections 24 may be provided on each additional side plate 22 or 23. The left and right additional side plates 22 and 23 may have the locking projections 24 different from each other in number. The left and right additional side plates 22 and 23 may have the locking projections 24 symmetrically positioned (opposed to each other) relative to a center line thereof.

The side plate 18 may be vertical with no outward inclination. The additional side plates 22 and 23 each preferably have an inward inclination to reliably hold the corrugated tube 4. However, the additional side plates 22 and 23 may be vertical when the corrugated tube 4 is secured by a winding tape.

The base member 9 may have a construction different from that illustrated in FIG. 2. For example, the base member 9 may have only one securing portion 12 at one side thereof. Without the base member 9, the car body 1 (FIG. 1) may be used in place of the base member 9. In that case, a bolt and a collar (not shown) may be used in place of the rivet 10, and a nut (not shown) is fitted on the car body 1. Alternatively, a stud bolt (not shown) may be imbedded in the car body 1, and the stud bolt and a collar are passed through an hole of the base plate 17 so that a nut can secure the base plate 17 on the car body 1 to turnably support the harness support 5. When the base member 9 is not provided, the harness support 5 may be called as a pivotal harness guide. The harness support 5 may be secured to the car body 1 with a bolt such that the locking projections 24 hold the corrugated tube turnable in a circumferential direction. These modified examples may be applied to any of embodiments described later.

Figure 3A:
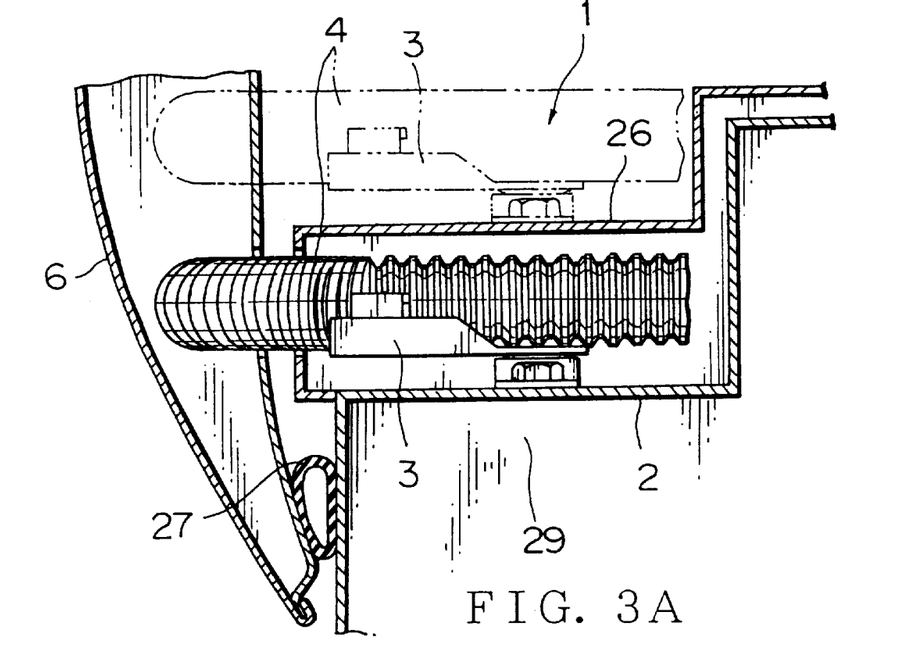
FIG. 3A is a longitudinal sectional view showing two examples of the pivotal harness guides mounted on a car body.

FIGS. 3A and 3B each show an arrangement example of the pivotal harness guide 3. In FIG. 3A, the pivotal harness guide 3 is disposed on an upper surface of a step 2 of the car body 1 or on an upper surface of a scuffing plate 26 positioned above and near the step 2. The corrugated tube 4 accomodating the wiring harness is arranged from the step 2 or the scuffing plate 26 to a side of the sliding door 6 via the pivotal harness guide 3.

Reference numeral 27 designates a weather strip (sealing member) provided in a side of the sliding door. The weather strip 27 protects the harness guide 3 and the corrugated tube 4 accomodating the wiring harness from outer water drops. The pivotal harness guide 3 may be positioned in a space 29 under the step 2.

Figure 3B:
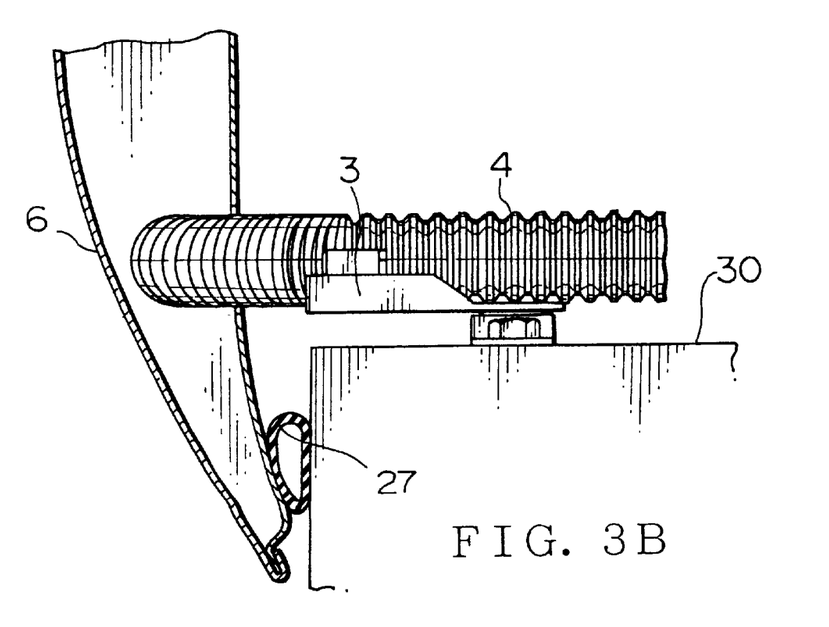
FIG. 3B is a longitudinal sectional view showing another example of the harness guide.

In anther arrangement of FIG. 3B, the pivotal harness guide 3 is disposed on an upper surface of a floor 30 of a van-type car having no such steps. The corrugated tube 4 accomodating the wiring harness is arranged from the floor 30 to the sliding door 6 via the harness guide 3. The corrugated tube 4 accomodating the wiring harness is protected from outside water drops in the use of the weather strip 27.

Figure 4:
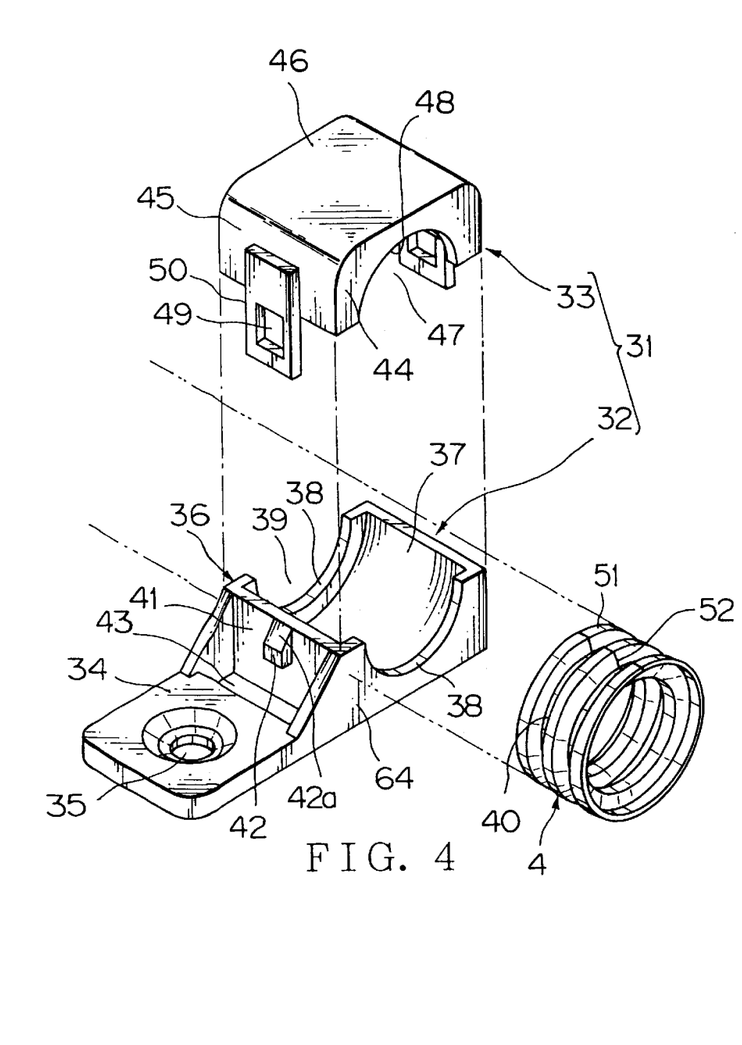
FIG. 4 is an exploded perspective view showing a second embodiment of a pivotal harness guide according to the present invention.

FIG. 4 shows a second embodiment of a harness support member harness support 31 turnably supporting a harness guide.

The harness support 31 can be turnably supported by the base member (FIG. 2) and the rivet 10 (FIG. 2) which are the same as those of the embodiment of FIG. 2. The same components will not be discussed again. In place of the base member 9, a bolt, a collar, and a nut may be used to turnably support the harness support 31. In that case, the harness support 31 is called as a pivotal harness guide. The harness support 31 may be secured to the car body 1 with a bolt such that the corrugated tube 4 is turnable in a circumferential direction. These modified examples may be applied to any of embodiments (FIGS. 6 and 7) described later.

The harness support 31 is divided into a lower cradle 32 and an upper cap 33 which are made of a synthetic resin material.

The cradle 32 has a horizontal short plate 34 formed with a fixing hole 35 for turnably supporting or securing it to the base member 9 or the car body. The cradle 32 also has a generally rectangular block 36 contiguous with the short plate 34. The block 36 is formed with a semicircle recess 37 which has a pair of semicircle brims 38 each positioned at each side end of the recess 37. Each brim 38 is formed with a semicircle cutout opining 39 having a peripheral edge engageable with a groove 40 of the corrugated tube 4.

The block 36 has a pair of left and right walls 41 each formed with a locking protrusion 42 (locking means) for the cap 33. The block 36 has an opening 43 for drawing out a molding die under an inner one of the locking protrusions 42.

The cap 33 has fore and rear walls 44, left and right walls 45, and a top wall 46. Each wall 44 is formed with a semicircle cutout opening 47 opposed to the semicircle brim 48 such that the brim 48 is engageable with a groove 40 of the corrugated tube 4. Each of left and right walls 45 is formed with a resilient depending lock piece 50 (locking means) having a locking hole 49.

The corrugated tube 4 has a plurality of valleys and peaks 40 and 51 on its outer surface, which are aligned in the longitudinal direction of the tube in the same way as illustrated in FIGS. 1 and 3. The corrugated tubes 4 including one illustrated in FIGS. 1 and 3 may have a longitudinal break line 52 for insertion of the corrugated tube 4. Preferably, the break line 52 is not be provided in the embodiments so that the corrugated tube 4 can smoothly turn in a circumferential direction within the harness support 31. The break line 52 of the corrugated tube 4 allows an easy insertion of the wiring harness having a plurality of electrical cables. In the mean time, the corrugated tube 4 having no break line 52 receives the wiring harness from a fore or rear end opening of the tube. The corrugated tube 4 having the break line 52 requires a winding work of a vinyl tape on the tube to close the break line 52, while the corrugated tube 4 having no break line 52 requires no such winding work.

A groove 40 of the corrugated tube 4 which has received a wiring harness (not shown) is engaged with each brim 38 of the cradle 32 to to be supported turnably in the circumferential direction of the tube. Next, the cap 33 is engaged with the corrugated tube 4 from above, so that the brim 48 of the cutout opening 47 of the cap 33 engages with a groove 40 of the corrugated tube 4, and at the same time, each locking protrusion 42 engages with each lock piece 50. Thereby, the cap 33 is locked to the cradle 32, so that the corrugated tube 4 is surely held between the cradle 32 and the cap 33 turnably in the circumferential direction of the tube to prevent the tube from drawing out from the harness support 31.

The harness support 31 consisting of the cradle 32 and the cap 33 is turnably supported by the base member 9 (FIG. 2) or the car body 1 (FIG. 1), so that the corrugated tube 4 accomodating the wiring harness is smoothly bent without an abnormal torsional or bending force since the harness support 31 turns horizontally with the opening and closing of the sliding door 6. The harness support member may have a turning angle limiting stopper (abutment projection) to abut against the base member 9. When the harness support 31 is directly turnably supported by the car body 1, such a stopper may be provided in a side of the car body 1. The opening and closing of the sliding door 6 exerts a torsional force on the corrugated tube 4. However, the corrugated tube 4 turns along the brims 38 and 48 in a circumferential direction of the corrugated tube 4 to release the torsional force, preventing an abnormal torsional deflection of the corrugated tube 4. The wiring harness received in the corrugated tube 4 can turn in its circumferential direction, so that the wiring harness can be bent smoothly, preventing an abnormal torsional deflection thereof. The harness support 31 may be secured on the car body without the turning of the harness support 31, but the corrugated tube 4 is turnable in its circumferential direction. The construction to release the torsional force of the corrugated tube 4 can be applied to embodiments (FIGS. 6 and 7) described later.

In FIG. 4, an additional flange or a projection for locking the corrugated tube 4 may be provided at a middle of the recess 37 of the block 36 or at an inner middle of the cap 33. The brims 48 of the cap 33 may be offset from the brim 38 of the cradle 32 in an axial direction of the tube. The cap 33 may have a locking projection in place of the lock piece 50, while the block side has a locking hole in place of the locking protrusion 42. The short plate 34 has a fixing hole 35 formed with a guiding chamfer for receiving a rivet or a bolt.

Figure 5:
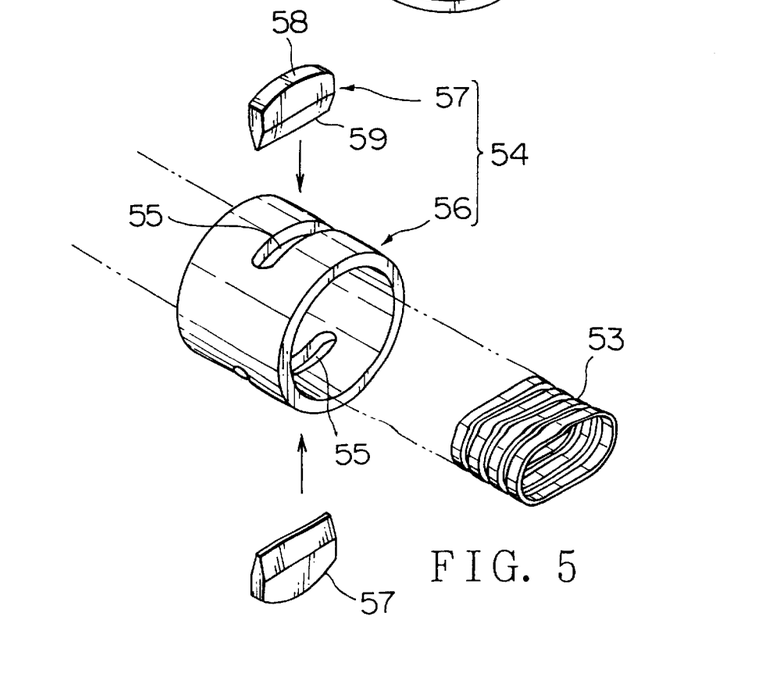
FIG. 5 is an exploded perspective view showing an attachment used for a flat corrugated tube.

In FIG. 5, the harness support 31 of FIG. 4 receives a flat corrugated tube 53 having an oval (elongated circle) shape. The corrugated tube 53 is secured in the use of an attachment 54 of FIG. 5.

The attachment 54 consists of a cylindrical member 56, which has a pair of upper and lower slits 55 (elongated hole) each extended in a circumferential direction of the cylindrical member 56, and an arc-shaped locking piece 57 (supporting member) insertable into the slits 55. The cylindrical member 56 is received turnably in its circumferential direction between the block 36 of the cradle 32 and the cap 33 without a looseness therebetween. The locking piece 57 has an arc-shaped portion 58 having the same shape as an outer periphery of the cylindrical member 56 in one side thereof, while the locking piece 57 has a wedge-shaped thin portion 59 engageable with a groove of the corrugated tube 53.

The locking piece 57 may have a locking projection. The cylindrical member 56 may have a cutout at its periphery for inserting the corrugated tube 53. The cylindrical member 56 may have a resiliency and may have a break line for insertion of the corrugated tube 53. The cylindrical member 56 may consist of two divided pieces, and another locking piece 57 may be unitarily formed on each piece of the cylindrical member 56.

The flat corrugated tube 53 may have a cable inserting break line 52 (FIG. 4) in the same way as that of FIG. 4. The configuration shown in FIG. 5 secures the corrugated tube 53 to the cylindrical member 56, and the cylindrical member 56 can be turned by the harness support 31 (FIG. 4). Thus, the presence or absence of the beak line makes no effects to the turning of the corrugated tube 53. The flat corrugated tube 53 accomodates a plurality of electrical cables (not shown) to have a flat profile.

The flat corrugated tube 53 accomodating the wiring harness is inserted into the cylindrical member 56, and the locking piece 57 is inserted into each of the slits 55 to engage with a groove of the flat corrugated tube 53. The locking piece 57 engages with the slit 55 such that the locking piece 57 does not project outward from the slit 55. Then, the cylindrical member 56 is engaged with the recess 37 of the cradle 32 of FIG. 4, and the upper cap 33 covers the cylindrical member 56 to prevent a longitudinal drawing-out of the cylindrical member 56. But, the cylindrical member 56 is turnable in its circumferential direction.

The opening and closing of the sliding door 6 exerts a torsional force on the corrugated tube 53. However, the cylindrical member 56 turns together with the flat corrugated tube 53 in its circumferential direction within the harness support 31 (FIG. 4), preventing an abnormal torsional deflection of the corrugated tube 4. The wiring harness can be bent smoothly, since an abnormal torsion deflection thereof is also prevented.

The locking pieces 57 may be arranged in a horizontal direction different from those of the FIG. 5, while the flat corrugated tube 53 is positioned such that its longer edge directs vertically and its shorter edge directs horizontally. Such arranged cylindrical member 56 is held between the cradle 32 and the cap 33, so that the flat corrugated tube 53 can be bent more smoothly than the circular corrugated tube 4 at the opening and closing of the sliding door.

The flat corrugated tube 53 may be pressed by a pair of locking pieces 57 in the longer diameter direction of the corrugated tube 53 so that the corrugated tube 53 deforms in a circular shape to be held within the harness support 31 of FIG. 4.

Figure 6:
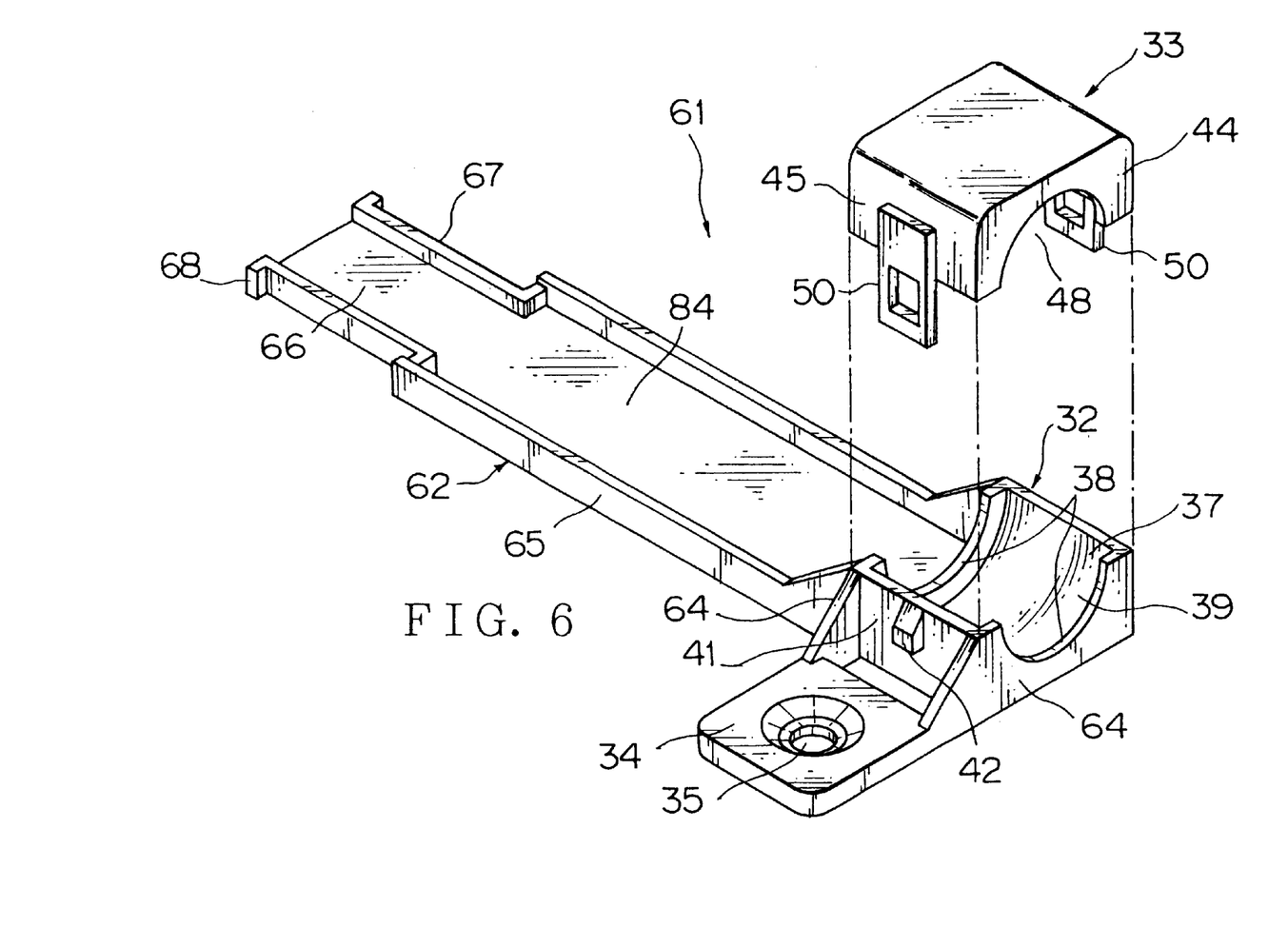
FIG. 6 is an exploded perspective view showing a third embodiment of a pivotal harness guide according to the present invention.

FIG. 6 shows a third embodiment of a harness support member 61 turnably supporting a harness guide.

The harness support 61 has a laterally elongated harness guide portion 62 extended from the cradle 32 of the harness support 31, and the other construction is the same as the harness support 31 of FIG. 4, for which the same reference numerals as those of FIG. 4 are used. When the harness support 61 is directly turnably supported by the car body without a base member, the harness support 61 is called as a pivotal harness guide. The harness support 31 may be secured to the car body such that the corrugated tube is turnable in its circumferential direction to prevent an abnormal torsional deformation of the corrugated tube.

The harness guide portion 62 is extended horizontally from one of the walls 64 of the cradle 32. The harness guide portion 62 has a supporting plate 84, a short side wall 65 formed at each side of the supporting plate 84 for guiding the corrugated tube 4, a reduced-width securing plate 66, a shorter side wall 67 formed at each side of the securing plate 66 for guiding the corrugated tube 4, and a pair of projections 68 provided at the tip of the securing plate 66. The securing plate 66 is used for securing the corrugated tube 4 (FIG. 4) with a winding tape or band to the harness support 61. The side wall 67 is shorter than the securing plate 66. The projection 68 is used to hook the tape or band.

The base end of the harness guide portion 62 is perpendicularly contiguous with the wall 64 of the cradle 32. Fore and rear walls 64 of the cradle 32 each have a semicircle cutout opining 39 having a brim 38 engageable with the corrugated tube. Between the brims 38, a semicircle recess 37 is defined. The block 36 has a pair of left and right walls 41 each formed with a locking protrusion 42 for the cap 33. The cradle 32 has a short plate 34 in a side opposed to one of the locking protrusions 42, and the short plate 34 is formed with a fixing hole 35 for turnably supporting or for securing the harness support 61.

The cap 33 has fore and rear walls 44 to define a brim 48 (holding projection) for holding the corrugated tube 4 (FIG. 4). The cap 33 also has left and right walls 45 each unitarily formed with a lock piece 50 engageable with the locking protrusion 42 of the cradle 32.

A groove of the corrugated tube 4 (FIG. 5) which has received a wiring harness (not shown) is engaged with each brim 38 of the cradle 32 to stop the longitudinal movement of the tube, and the tube is stably supported on the harness guide portion 62 not to move downward. Next, the cap 33 is engaged with the corrugated tube 4 from above, so that the fore and rear brims 48 of the cap 33 each engage with a groove 40 (FIG. 4) of the corrugated tube 4. Thereby, the corrugated tube 4 is surely held between the cradle 32 and the cap 33 turnably in the circumferential direction of the tube without any looseness in fore, rear, left, and right directions.

Then, the corrugated tube 4 is secured on the securing plate 66 in a forward side of the harness guide portion 62 with a fixing means like a band such that the corrugated tube 4 is turnable in its circumferential direction. The corrugated tube 4 is secured by the brims 38 and 48 in its longitudinal rear side and by the band in the forward side such that the corrugated tube 4 is turnable in its circumferential direction. Thereby, an abnormal springback or torsional deformation of the tube accomodating the wiring harness is prevented at the opening and closing of the sliding door 6.

The fixing hole 35 of the cradle 32 is turnably supported by the base member 9 (FIG. 2) or the car body 1 (FIG. 1) with a rivet 10 or a bolt having a nut, so that the corrugated tube 4 accomodating the wiring harness is smoothly bent without an abnormal torsional or bending force since the harness support 61 turns horizontally around the fixing hole 35 with the opening and closing the sliding door 6.

Particularly, the elongated harness guide portion 62 supports the corrugated tube 4 accommodating the wiring harness horizontally over a straight length, so that an undesired sag of the corrugated tube 4 is eliminated. Thus, the corrugated tube 4 is prevented from pinching and jamming thereof between the sliding door 6 and the car body 1. A turning range limiting stopper (abutting projection) may be provided on the car body to abut against the short side wall 65 of the harness guide portion 62 or against a side surface of the cradle 32. Alternatively, such a stopper may be provided on the cradle 32 of the harness guide portion 62 to abut against the base member 9 (FIG. 2).

Between the cradle 32 of the harness support 61 and the cap 33 of FIG. 6, the attachment 54 of FIG. 5 may be inserted to hold the flat corrugated tube 53.

Figure 7:
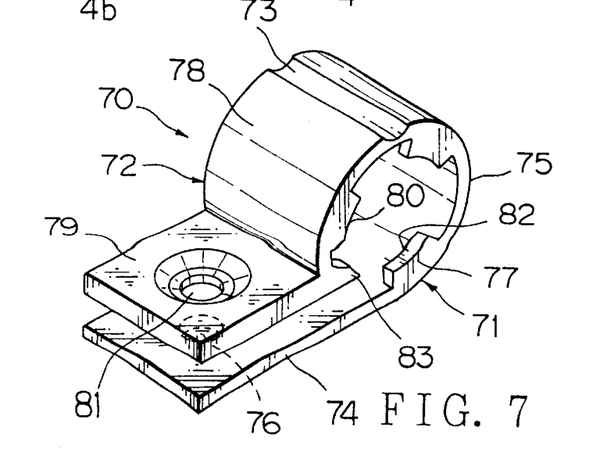
FIG. 7 is a perspective view showing a fourth embodiment of a pivotal harness guide according to the present invention.

FIG. 7 shows a fourth embodiment of a harness support 70 turnably supporting a harness guide. When the harness support 70 is directly turnably supported by the car body without the base member 9, the harness support 70 is called as a pivotal harness guide. The harness support 70 may be secured to the car body such that the corrugated tube is turnable in its circumferential direction to prevent an abnormal torsional deformation of the corrugated tube.

The harness support 70 has a configuration similar to a unitary combination of the cradle 32 and the cap 33 of FIG. 4. The harness support 70 consists of a lower cradle 71 and an upper cap (cover) 72 unitarily formed with the lower cradle 71 via a hinge 73 having a small thickness.

The cradle 71 has a horizontal plate 74 and a generally semicircle curbed portion 75 contiguous with the plate 74. The plate 74 has a hole 76 for turning and supporting the harness support 70. The curbed portion 75 has an inner surface formed with two arc-shaped locking projections 77 at each side of the curbed portion 75 for stopping the corrugated tube. The hinge 73 is positioned in a top side of the harness support 70.

The cradle 71 contiguous with the hinge 73 consists of a generally quarter-circle curbed portion 78 and a horizontal plate 79 contiguous with the curbed portion 78. The curbed portion 78 has an arc-shaped portion at each side end thereof for stopping the corrugated tube. The plate 79 is formed with a hole 81 for turning and supporting the corrugated tube. Each of the locking projections 77 and 80 has a short arc-shaped surface 82 guiding a peripheral surface of a groove 40 of the corrugated tube 4 (FIG. 4).

The plates 74 and 79 are vertically oppose to each other, and the holes 76 and 81 are vertically aligned with each other. Another locking projection 83 is provided in an inner surface of the upper curbed portion 78 near an intersecting portion of the curbed portions 78 and 79. At the closing state of the upper cover 72, the curbed portions 75 and 78 define a right circle.

Inside the curbed portions 75 and 78, the attachment 54 of FIG. 5 may be received such that the attachment 54 is turnable in its circumferential direction. Fore and rear edges of the cylindrical member 56 (FIG. 5) are stopped by the locking projections 77, 80, and 83 to prevent the longitudinal drawing-out of the cylindrical member 56 from the harness support 70.

The corrugated tube 4 (FIG. 4) accomodating the wiring harness is inserted into the inside of the harness support 70 at an open state of the upper cover 72. The locking projections 77 are engaged with grooves 40 (FIG. 4), and the upper cover 72 is closed, so that the locking projections 80 and 83 are engaged with the grooves 40. Thus, the locking projections 77, 80, and 83 stop a longitudinal movement of the corrugated tube 4 but turnably in a circumferential direction of the corrugated tube 4. When the flat corrugated tube 53 is used, with the corrugated tube 53 being held by the attachment 54 of FIG. 5, the attachment 54 is supported by the harness support 70.

Finally, a bolt is passed through the holes 81 and 76 to fit the harness support 70 turnably on the base member 9 (FIG. 2) or the car body 1 (FIG. 1). Alternatively, the lower hole 76 may be preliminarily turnably fitted on the base member 9 with a bolt or a rivet 10 (FIG. 2), and then the upper cover 72 is closed such that the upper hole 81 is engaged with the head of the bolt or the rivet 10.

The upper cover 72 unitarily formed with the cradle 71 allows an easy opening and closing operation of the upper cover 72, because the cap 33 of FIG. 4 is not required. With the opening and closing movement of the sliding door 6 (FIG. 1), the harness support 70 turns around the lower hole 76, so that the corrugated tube 4 and the wiring harness are smoothly bent without an abnormal torsion or bending force. The corrugated tube 4 turns within the harness support 70 in the circumferential direction of the tube to decease a torsional force exerted on the tube, which is similar when the harness support 70 is secured on the car body.

The locking projections 77, 80, and 83 of FIG. 7 may be replaced by the annular brims 38 and 48 of FIG. 4. On the contrary, the annular brims 38 and 48 of FIG. 4 may be replaced by the locking projections 77 and 80 of FIG. 7. In place of the upper plate 79 (FIG. 7), a locking means (not shown) may be provided to engage the upper cover 72 with the lower plate 74. One of the lock pieces 50 of the cap 33 of FIG. 4 may be replaced by a hinge (not shown) to join the cap 33 pivotably to the cradle 32.

Figure 8:
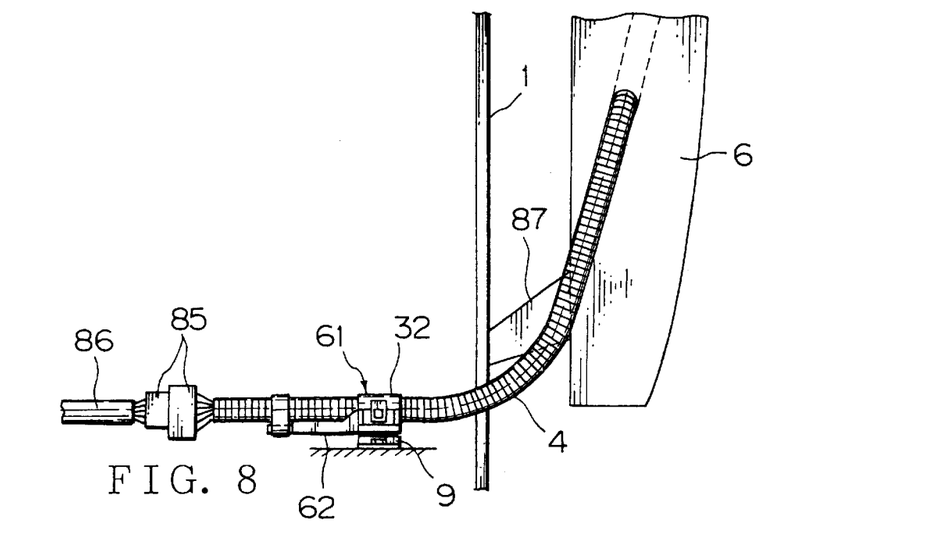
FIG. 8 is a longitudinal sectional view showing an example of the pivotal harness guide mounted on a car body.

FIG. 8 shows an example of a wiring harness arrangement in which the harness support 61 of FIG. 6 is positioned on the car body 1. The cradle 32 of the harness support 61 is turnably supported by the base member 9 in an outerside of the car body 1, and the elongated harness guide portion 62 is extended inward within the car body 1. The corrugated tube 4 is supported by the harness guide portion 62, and the wiring harness received in the corrugated tube 4 is connected to another wiring harness 86 provided inside the car body 1 via male and female connectors 85.

In FIG. 8, reference numeral 87 designates a slider extended from the sliding door 6 and having a guide roller at a forward end thereof. The guide roller contacts a horizontal rail (not shown) fitted on the car body 1. The harness support 61 may have a turning limiting means which functions at a full or substantially full open state of the sliding door 6. That is, the turning limiting projection provided on the car body 1 for the harness support 61 or provided on the harness support 61 relative to the base member 9 (FIG. 2) can control the movement of the corrugated tube 4 accomodating the wiring harness. In the configuration illustrated in FIG. 8, the corrugated tube 4 is positioned substantially on the slider 87. Thus, the slider 87 prevents a sag of the corrugated tube 4 due to its gravity or an external force. The abutment projections or stoppers of FIG. 2 may be replaced by a rib fitted on a synthetic resin scuffing plate 26 or a metal step 2 of the car body 1. The stoppers may be made of metal or synthetic resin according to its fitting location. The stoppers may be made by one-piece molding or may be formed from a plate. When the harness support 61 is mounted not on the car body but on the sliding door, a stopper for the harness guide portion 62 may be provided on the sliding door.

The harness guide portion 62 of FIG. 8, which is extended not toward the sliding door but toward the inside of the car body 1, isolates the movement of the corrugated tube 4 accomodating the wiring harness from the floor side wiring harness 86. Thus, the male and female connectors 85 receive no force to disengage from each other, improving an electrical connection between the connectors 85.

In FIG. 8, the cradle 32 of the harness support 61 is positioned inside the car body 1, while the harness guide portion 62 may be extended toward the sliding door 6. This achieves the same effect as the aforementioned arrangement. In place of the harness support 61 of FIG. 6, any one of the harness supports 5, 31, 61, and 70 illustrated in FIG. 2 and FIGS. 4 to 7 may be applied in the aforementioned harness arrangement.

One of the harness supports 5, 31, 61, and 70 illustrated in FIG. 2 and FIGS. 4 to 7 may be fitted not on the car body 1 but on the sliding door 6 turnably or fixedly. At the same time, the base member 9 (FIG. 2) may be provided. Any one of the harness supports 5, 31, 61, and 70 may be arranged both in a side of the car body 1 and in a side of the sliding door 6, in which any combination of the harness supports 5, 31, 61, and 70 may be acceptable. In FIG. 8, the harness support 61 may be placed on the step 2, the scuffing plate 26, or the floor 30 of FIGS. 3A and 3B.

The harness supports 5, 31, 61, and 70 may be turnably fitted to the car body 1 or the sliding door 6 not horizontally but vertically.

Figure 9:
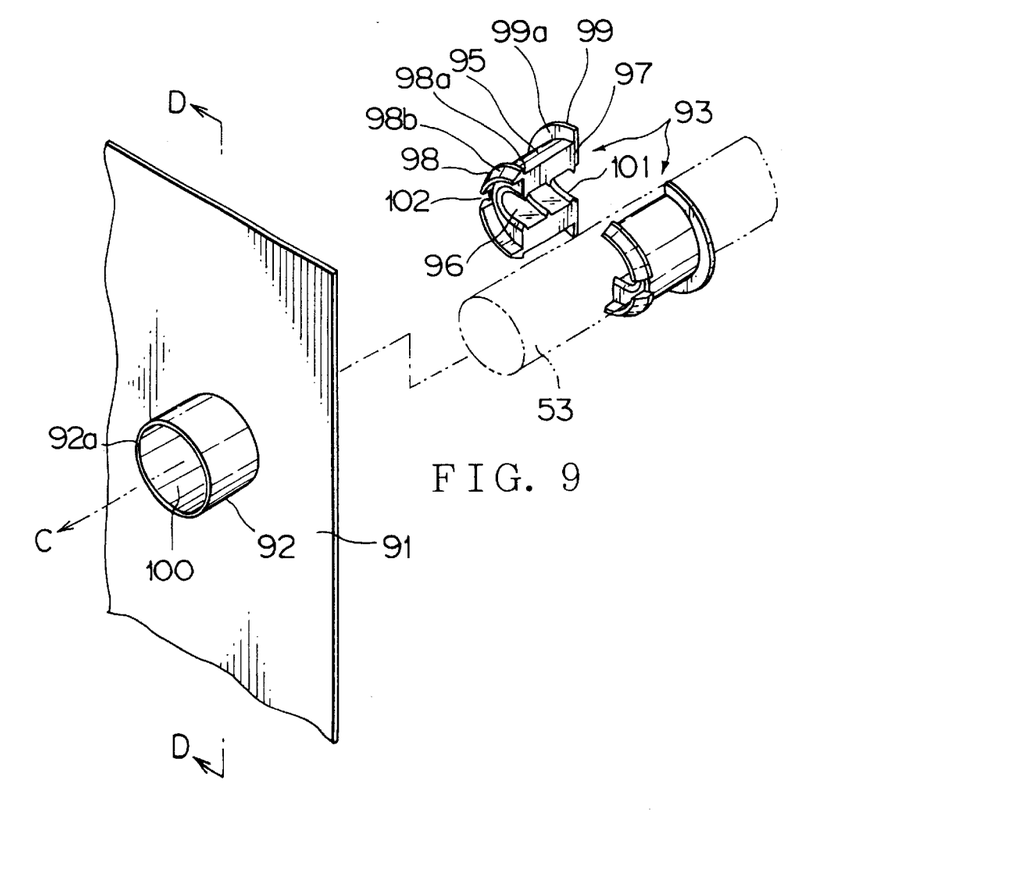
FIG. 9 is an exploded perspective view showing another embodiment of a wiring harness arrangement assembly for a sliding door according to the present invention.
Figure 10:
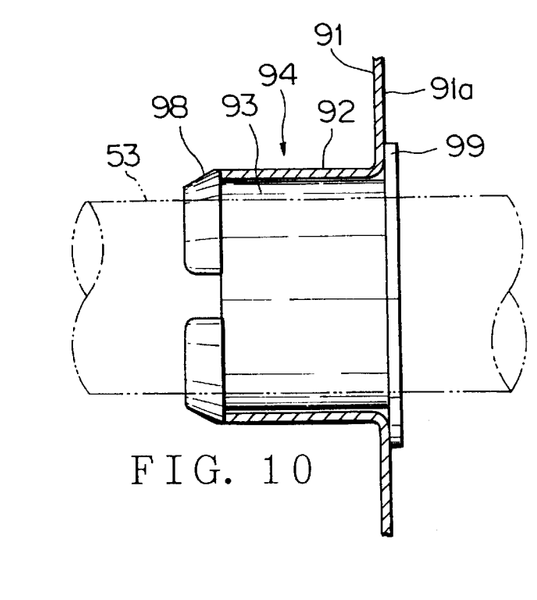
FIG. 10 is a longitudinal sectional view taken along line D—D of FIG. 9 to show a completed state of the wiring harness arrangement assembly.

FIGS. 9 and 10 show another embodiment of a wiring harness arrangement assembly according to the present invention.

As illustrated in FIG. 9, a vertical panel 91 of the car body is provided with a horizontal cylindrical wall 92, and a pair of divided harness supports 93 radially support a corrugated tube 53 accomodating the wiring harness. Then, the harness support 93 is inserted into the cylindrical wall 92 turnably in a circumferential direction of the harness support 93.

The panel 91 may be a vertical wall located at a rear end of a step of the car body. The panel 91 may be generally vertical, and the cylindrical wall 92 may be generally horizontal. The cylindrical wall 92 may be generally perpendicular to the panel 91. The cylindrical wall 92 is preferably formed unitarily with the panel 91 from a metal sheet by press forming to reduce a manufacturing cost thereof.

The cylindrical wall 92 has an inwardly extended insertion passage 100. The panel 91 and the cylindrical wall 92 may be made of a synthetic resin material and may be unitarily formed with each other. The cylindrical wall 92 may be provided in another panel located in a side of the sliding door such that the pair of the harness supports 93 inserted into the cylindrical wall 92 turnably support the corrugated tube 53. In place of the cylindrical wall 92 and the panel 91, another larger thickness wall (not shown) made of urethane or another synthetic resin may be provided, and a through hole may be provided to receive another cylindrical wall. The through hole may directly receive the harness support 93.

The embodiment illustrated in FIG. 9 is functionally similar to the harness supports 31 and 70 shown in FIG. 4 or 7. The two-piece type harness support 93 and the cylindrical wall 92 compose a harness guide 94 (FIG. 10). The harness support 93 is inserted into the cylindrical wall 92.

In FIG. 9, the harness support 93 is made of a synthetic resin material has divided into left and right pieces symmetric with each other. Each harness support 93 has an outer peripheral surface 95 having a semicircular section, an inner peripheral surface 96 having an elongated semicircular section, an engagement surface 97 joining the outer peripheral surface 95 to the inner peripheral surface 96, a flexible stopper hook 98 (engagement portion) positioned at its forward end, and a flange 99 (stopper) positioned at its rear end. The inner peripheral surface 96 has a shape to fit with the flat corrugated tube 53 having an elongated circle section.

The outer peripheral surface 95 is a smooth surface which defines a circle when both the harness supports 93 are bonded to each other. The outer peripheral surface 95 has a diameter slightly smaller than the inner diameter of the cylindrical wall 92 of the panel 91. On the inner peripheral surface 96, there are provided three locking projections 101 engaged with grooves of the corrugated tube 53 (FIG. 5), and the locking projections 101 are positioned respectively at a forward, middle, or rear part of the inner peripheral surface 96.

When the circular section corrugated tube (designated by reference numeral 4 in FIG. 4) is utilized, the inner peripheral surface 96 is configured in a semicircular shape and has projections 101 each having a semicircular shape. The corrugated tube 4 is supported by the inner peripheral surfaces 96 turnably along the inner peripheral surfaces 96. Preferably, there are provided at least two locking projections 101 to achieve an increased longitudinal stopping strength for the corrugated tube 53.

The forward stopper hook 98 is divided into upper and lower pieces by a cutout 102. The cutout 102 provides an increased flexibility of the stopper hook 98. The stopper hook 98 has a stopping surface 98a vertically raised from the outer peripheral surface 95 and a tapered guide surface 98b extended from the stopping surface 98a to generally define a right-angle triangle in section. The stopper hook 98 has an outer diameter larger than the inner diameter of the cylindrical wall 92 of the panel 91.

The rear flange 99 is vertically raised from the outer peripheral surface 95 to be extended outward to have a diameter larger than the forward stopper hook 98. The distance between the stopping surface 98a of the stopper hook 98 and a fore end surface 99a of the flange 99 is slightly longer than the distance between the fore end 92a of the cylindrical wall 92 and a rear wall 91a (FIG. 10) of the panel 91.

The pair of harness supports 93 maybe joined by a hinge (not shown) at a side of the engagement surfaces 97. In place of the corrugated tube 53, a protecting tube (not shown) such as a knitted tube made of another resin material may be used. A wiring harness consisting of a plurality of electrical cables which are made into a bundle with winding vinyl tapes may be directly supported by the harness support 93 turnably in its circumferential direction. This requires no locking projections 101 of the inner peripheral surface 96.

In FIG. 9, the pair of harness supports 93 hold the corrugated tube 53 therebetween, which are inserted into the cylindrical wall 92 of the panel 91 in a direction shown by an arrow C. The mounting work of the harness support 93 on the cylindrical wall 92 is preferably carried out at the same time as the insertion of the wiring harness into cylindrical wall 92. The corrugated tube 53 accomodating the wiring harness may be preliminarily inserted into the cylindrical wall 92, and then the harness support 93 may be inserted into the cylindrical wall 92.

At the insertion of the harness support 93 into the cylindrical wall 92, the forward stopper hook 98 deflects inward to allow the advance of the harness support 93. The stopper hook 98 resiliently returns to its original position when the stopper hook 98 is extended outward from a fore end 92a of the cylindrical wall 92. Thereby, as illustrated in FIG. 10, the stopping surface 98a of the stopper hook 98 abuts against the fore end 92a of the cylindrical wall 92, while the rear flange 99 abuts against the rear wall 91a of the panel 91.

Accordingly, the harness support 93 is secured in its longitudinal direction, and the outer peripheral surface 95 is opposed to the cylindrical wall 92 with a small clearance therebetween, so that the harness support 93 is supported by the cylindrical wall 92 turnably in its circumferential direction. Thereby, the wiring harness and/or the corrugated tube 53 can make a smooth torsional movement since they pivot together with the harness support 93. This surely eliminates a damage of the wiring harness and the corrugated tube 53 due to an abnormal torsional deflection thereof.

In the embodiment, the harness support 93 can be mounted on the panel 91 of the car body by only one assembling step, and the cylindrical wall unitarily formed with the panel 91 allows a decreased manufacturing cost of parts thereof. These are advantageous as compared with the harness supports 31 and 70 illustrated in FIG. 4 or 7.

What is claimed is:

1. A wiring harness arrangement assembly for arranging a wiring harness received in a corrugated tube from a body to a sliding door of a car, wherein a pivotal harness guide is provided in a side of the body or of the sliding door, and the corrugated tube is secured to the harness guide, and wherein the harness guide has a harness support member for securing the corrugated tube to the harness guide and a base member for turnably connecting the harness support member to the base member by a connecting member, and the base member is secured to the body or the sliding door.

2. The wiring harness arrangement assembly as described in claim 1, wherein a harness guide is provided in a side of the body or of the sliding door, and the corrugated tube is held turnably in a circumferential direction of the corrugated tube by the harness guide.

3. The wiring harness arrangement assembly as described in any one of claim 1, wherein the harness guide has a locking projection that engages with a groove formed in the corrugated tube.

4. The wiring harness arrangement assembly as described in claim 3, wherein the corrugated tube is turnable in its circumferential direction along the locking projection.

5. The wiring harness arrangement assembly as described in claim 1 wherein the harness guide is positioned on a step, a scuffing plate, or a floor of the car body.

6. A wiring harness arrangement assembly for arranging a wiring harness received in a corrugated tube from a body to a sliding door of a car, wherein a pivotal harness guide is provided in a side of the body or of the sliding door, and the corrugated tube is secured to the harness guide, and wherein a stopper for limiting a pivoting angle of the harness support member is provided on the harness guide, the body, or the sliding door.

7. A wiring harness arrangement assembly for arranging a wiring harness received in a corrugated tube from a body to a sliding door of a car, wherein a pivotal harness guide is provided in a side of the body or of the sliding door, and the corrugated tube is secured to the harness guide, and wherein the harness guide has a locking projection that engages with a groove formed in the corrugated tube, a base plate for positioning the corrugated tube along the base plate, a side plate raised from each side of the base plate, and an additional side plate raised from each of the side plate, the additional side plate formed with the locking projection projected inside of the harness guide.

* * * * *